(12) United States Patent  (10) Patent No.: US 6,353,694 B1
Paiam  (45) Date of Patent: Mar. 5, 2002

(54) MMI THERMO-OPTIC COUPLER

(75) Inventor: Reza Paiam, Ottawa (CA)

(73) Assignee: JDS Uniphase Inc., Nepean (CA)

( * ) Notice: Subject to any disclaimer, the term of this patent is extended or adjusted under 35 U.S.C. 154(b) by 0 days.

(21) Appl. No.: 09/556,188

(22) Filed: Apr. 21, 2000

(30) Foreign Application Priority Data

Apr. 30, 1999  (CA) ............................................. 2271159

(51) Int. Cl.[7] ................................................ G02B 6/26
(52) U.S. Cl. ..................... 385/39; 385/129; 385/130; 385/131; 385/40
(58) Field of Search ................... 385/27–29, 39, 385/40–42, 129–133

(56) References Cited

U.S. PATENT DOCUMENTS

| | | | | |
|---|---|---|---|---|
| 5,295,011 A | * | 3/1994 | Heise | 385/41 |
| 5,640,474 A | | 6/1997 | Tayag | 385/43 |
| 5,857,039 A | | 1/1999 | Bose et al. | 385/14 |
| 6,243,525 B1 | * | 6/2001 | Luizink et al. | 385/132 |

FOREIGN PATENT DOCUMENTS

| | | | | |
|---|---|---|---|---|
| EP | WO 95/12828 | 5/1995 | ............ | G02B/6/28 |
| JP | 04238305 | 8/1992 | ............ | G02B/6/12 |
| JP | 11084434 | 3/1999 | ............ | G02F/1/313 |

OTHER PUBLICATIONS

"4x4 Polymer Thermo–Optic Directional Coupler Switch at 1.55 $\mu$ m" Keil et al, Electronics Letters, IEE Apr. 14, 1994, vol. 30, No. 8 pp. 639–640.

* cited by examiner

*Primary Examiner*—Darren Schuberg
*Assistant Examiner*—Fayez Assaf
(74) *Attorney, Agent, or Firm*—Neil Teitelbaum

(57) ABSTRACT

A multi-mode interference coupler is disclosed for coupling light between ports. The MMI coupler is a planar waveguide having a first input port for launching light into a core of the planar waveguide which has first refractive index $n_1$. The waveguide is dimensioned to have a response that confines light launched therein to a single mode in one dimension, and multi-mode in another dimension. Two other ports are provided for receiving light launched into and propagating through the core from the input port. A polymer cladding of a second material having a refractive index $n_2$ covers at least a portion of the core. A heater is provided and is thermally coupled to the cladding for heating the cladding when a control signal is applied.

5 Claims, 2 Drawing Sheets a - a'

MMI THERMO-OPTIC COUPLER

FIELD OF THE INVENTION

This invention relates to a multi-mode (MMI) coupler, and more particularly to an MMI coupler having a polymer cladding.

BACKGROUND OF THE INVENTION

In the processing of light beams for example, in telecommunications applications, important and desired functions are the splitting and combining of light beams. In conventional optics, prisms or pellicle splitters are used for this purpose. Attempts are continually being made to reduce the dimensions of the optical components to a considerable extent. On the one hand, it is being attempted in three dimensions to realise the processing of light beams by means of interference phenomena such as holography and free space optics. On the other hand, the technique of integrated optics is developing very rapidly. In this technique, waveguides are patterned on thin-film layers. It is an object of integrated optics to realise the functionality of the components used in conventional optics by new, integrable optical elements. This research field has found important applications in the field of communication.

In fiber-optical communication, data are transmitted by means of optical signals through otpical fibers. The optical signals are processed on integrated optical chips which are placed between the fibers. To manufacture these chips, generally thin-film layers are provided on support substrates such as, for example glass, Si, InP, GaAs and subsequently structured.

In optical waveguides the light is guided through a medium referred to as the waveguide core. The guidance is realised in that the waveguide core is bounded by a reflecting transition. In cavity waveguides, a metal is used for this purpose. In dielectric waveguides, the total reflection on a surrounding medium having a smaller refractive index the waveguide cladding is used. In optical waveguides, only those modes can propagate which fulfil the Maxwell equations. The waveguides are referred to as cut-off, monomode or multimode waveguides, dependent on whether they can guide no mode, only one mode for each polarization or a plurality of modes.

In waveguides, the light propagates in the longitudinal z direction. The x direction is parallel to the waveguide layer and is defined as the horizontal, or lateral direction. Analogously, the y direction is vertical to the waveguide layer and is defined as the vertical, or transversal direction. The propagation of light on the chips is computed by means of numerical methods such as beam propagation (BPM) methods, or modal propagation analysis (MPA) methods. In some cases, semi-analytical computations such as the effective index method (EIM) are used. The Maxwell equations are often solved in a scalar approximation. These equations describe the planar optics exactly. Two polarizations can be distinguished: the TE polarization has the E vector in the x direction. and the TM polarization has the H vector in the x direction. For the most frequently used dielectric waveguides in integrated optics, the scalar approximation leads to "quasi-TE" and "quasi-TM" modes. In such waveguides, the mode forms and the "effective" indexes may be dependent on the polarization. In many cases it is very much desirable, but very difficult, to produce components which are independent of polarization. It should be noted that "monomode" waveguides often have a mode for each polarization, i.e. overall, there are often two modes in "monomode" waveguides. These are degenerate modes in normal optical glass fibers.

Important components in integrated optics are the beam splitters and combiners. Generally, one refers to N×M splitters. N×M denote the number of inputs and outputs. Ideally, these splitters should have the following properties: they should be compact (having small dimensions), independent of polarization, not very sensitive to manufacturing inaccuracies and easy to produce. Moreover, it should be possible to readily adapt the splitting or combining ratios to the various applications by geometrical changes in the design. Various beam splitters and combiners have already been realised: Symmetrical Y branches are simple solutions for 1×2 splitters with a 50%/50% intensity ratio. Asymmetrical Y branches yield other intensity ratios but, due to coupling effects, they are often polarization-dependent between the two outputs. For manufacturing Y branches, a high resolution, particularly in the sharp bifurcation, is required. They are very sensitive to manufacturing inaccuracies.

Directional couplers with two parallel waveguides separated by means of a narrow slit operate as 2×2 splitters. However the coupling length is, however, very sensitive to manufacturing parameters, particularly as regards slit width and depth. The coupling length is also very much dependent on polarization. "Two-mode" interference (TMI) couplers without a slit also operate as 2×2 splitters. The intensity ratio is, however, very much dependent on the coupling into the input and output Y branches. Consequently, they are very sensitive to manufacturing conditions. U.S. Pat. No. 5,857,039 describes a thermo-optically activated directional coupler having a polymer guide buffer layer and a heater which allows the refractive index of the polymer to be varied. Of course it is well known that polymer has a higher refractive index variation with temperature than silica and better heat confinement. The '039 patent extols the virtues of polymer over silica especially in the interguide space. When the interguide space is small in relation to the dimensions of the cross section, the guides can only be properly covered by the mineral layer, particularly in the case of silica coverings, by a so-called "FHD" technique which is extremely difficult to apply. Therefore, the '039 patent provides a solution which is tailored to providing a more practicably directional coupler.

It is somewhat obvious, in hindsight, that in a directional coupler wherein coupling of light across a cladding boundary between two closely spaced waveguides is to be accomplished, that the boundary region must be controlled to increase or decrease the coupling across this region. Ergo, in order to allow the two single mode signals to couple, or to remain isolated, in a controlled manner, this intermediary cladding region must be highly manufacturable and controllable. As the '039 patent purports, a polymer disposed between these cores, provides a practicable solution.

The use of a polymer cladding on an silica filament strand of optical fibre is well known, and has been disclosed in U.S. Pat. No. 4,116,654 issue Sep. 26, 1978. In this patent it is stated that "Where low attenuation of transmitted light in an optical fiber material is critical, the preferred material for the filamentary core is silica, since it has one of the lowest attenuations presently known. Suitable cladding materials known in the art include thermoplastic polymers which have an index of refraction lower than that of the core; and which preferably are substantially amorphous."

A further mention of polymer cladding is found in U.S. Pat. No. 5,873,923 in the name of DiGiovanni, with reference to optical amplifiers.

In this patent, a polymer cladding is suggested in a multi-clad fibre amplifier, where the 923 patent states that "Any polymer cladding serves little purpose beyond guiding".

Considering the teaching of DiGiovanni, and that of U.S. Pat. No. 5,857,039, it is evident that the cladding guides the light within a waveguide or optical fibre and when the relative refractive index difference between the cladding and the core is varied the confinement of light within a guide varies as well.

What is surprising however, is that significance of providing a cladding on a multi-mode coupler which operates under a very different regime. What is further surprising is how coupling within a wide MMI core is affected by varying the cladding on top. Notwithstanding, this will be explained.

In the last few years, multimode interference (MMI) couplers have become more and more popular. These components are waveguide sections guiding a plurality of modes. They are produced, for example by widening a conventional waveguide structure until it guides a sufficient number of modes. The lateral guidance is then, for example, also often increased. Thanks to their self-imaging property, these couplers operate as N×M splitters in two or three dimensions. "Conventional" MMI couplers as used throughout the specification and the following claims are understood to be those elements having parallel sides. It is to be noted that MMI couplers can also be made with slanting sides. Several prior art patents describe the function and operation of the MMI couplers, such as U.S. Pat. No. 5,698,597 in the name of Besse, issued Nov. 18, 1997, and U.S. Pat. No. 5,953,467 in the name of Madsen issued Sep. 14, 1999, both incorporated herein by reference. Since the invention deals exactly with this point, it is necessary to elucidate the properties of the "conventional" MMI couplers.

Heretofore, MMI couplers have been very difficult to manufacture with a great deal of accuracy. Notwithstanding, since these devices are not highly tolerant to imperfect manufacturing, producing MMI couplers has been a feat, and until now, has remained a costly process. The invention discovered here concerns providing a polymer layer atop the MMI wide core and lessens the requirement for accuracy in manufacturing and allows a device to be tuned to meet required specifications, within predetermined limits. For example, a poorly manufactured device can be tuned to perform as a perfectly manufactured device that meets its original specifications. Hence, many fewer devices are rejected and discarded as rejects.

A second advantage of this invention is that devices can be tuned to provide a controlled and variable output. For example, the MMI coupler can function as a switch or a variable coupler.

In hindsight, after considering this invention, it is not intuitive, since multi-modes are mixed with a single wide guide having confinement only in the vertical dimension wherein the modes are "essentially" free to mix in a lateral dimension; thus it is quite surprising that the discovery of the provision of a polymer confining layer over top of the single multi-mode guide would yield any significant advantage.

Notwithstanding, best mode working embodiments will be described.

SUMMARY OF THE INVENTION

It is an object of the invention to provide an MMI coupler that is tunable and that is more tolerant to manufacturing inaccuracies due to its tunability.

In accordance with the invention a multi-mode interference coupler for coupling light between ports is provided, comprising:

a first input port for launching light into a core of a substantially planar waveguide of a first material having a first refractive index $n_1$, the substantially planar waveguide having a response that confines the light to a single mode in one dimension, and multi-mode in another dimension;

at least two output ports for receiving light launched into and propagating through the core from the input port;

a polymer cladding of a second material having a refractive index $n_2$ covering at least a portion of the core; and, a heater thermally coupled to said cladding for heating the cladding in dependence upon a control signal, to vary at least one of a) the amount of light received at the at least two output ports and, b) the ratio of light distributed between the output ports, wherein at least one of the first material and the second material is a polymer.

BRIEF DESCRIPTION OF THE DRAWINGS

Exemplary embodiments of the invention will now be described in conjunction with the drawings in which.

DETAILED DESCRIPTION

Figure 1A:
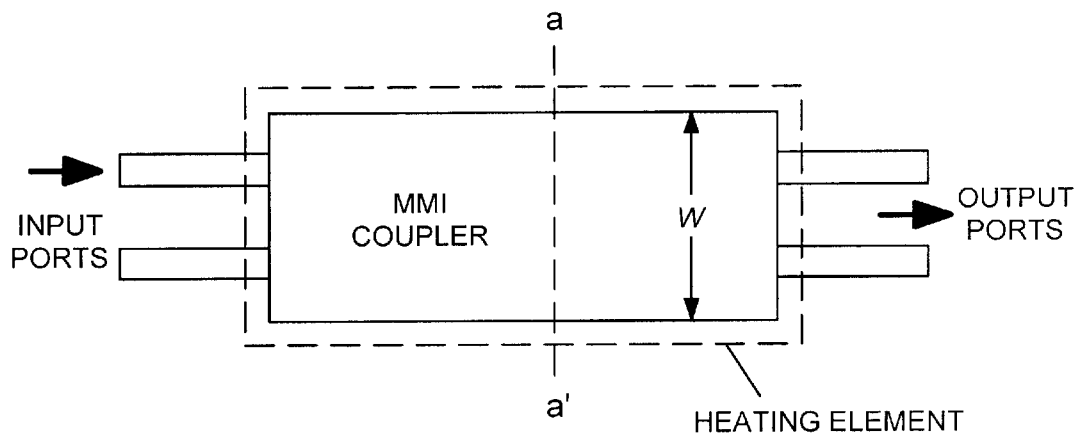
FIG. 1a is a top view of an MMI-based thermo-optic switch/attenuator.
Figure 1B:
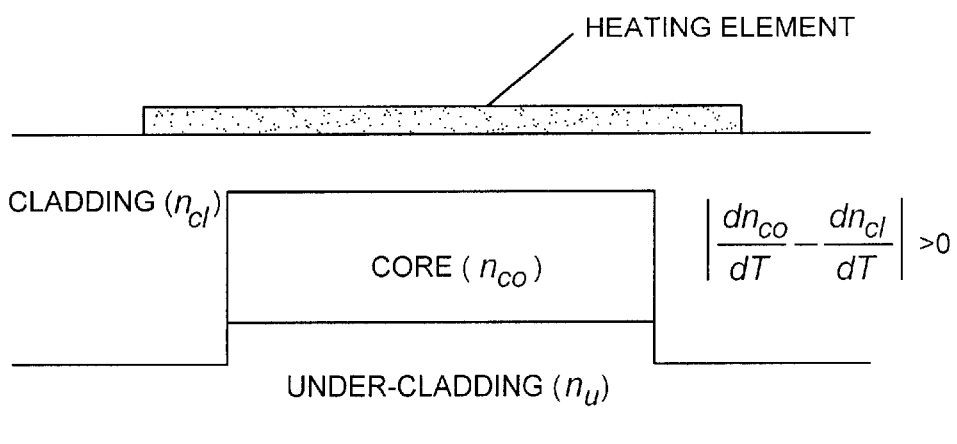
FIG. 1b is a cross-section of the device having a polymer cladding.

Referring now to FIGS. 1a and 1b, a thermo-optic optical switch or attenuator in the form of an MMI couplers as shown. The MMI coupler has two input ports and two output ports. Alternatively one input port can be provided. This device can be used as a switch or an attenuator. Switching is done by changing the temperature of the device through the heating element placed on top of the device. Alternatively, the same thermo-optic effect can be used to initially compensate for the fabrication variations of the coupler.

A most important parameter in the design of MMI couplers is their beatlength, $L_\pi$. After fabrication of a device, tuning and switching can be performed by varying its beatlength. For MMI couplers, the beat length at a wavelength $\lambda_0$ is defined as $$L_\pi = \frac{\pi}{\beta_0 - \beta_1} \cong \frac{4n_{ver}W_e^2}{3\lambda_0}, \qquad (1)$$

where $\beta_0$ and $\beta_1$ are the propagation constants of the fundamental and first order modes, respectively, $n_{ver}$ is the slab effective index at the guiding region, and $W_e$ is the effective width of the fundamental transverse mode. The effective width ($W_e$) is slightly larger than the actual width (W) of the multimode waveguide and takes into account the lateral penetration depth of the modal field. The effective width depends on the waveguide characteristics. It can be approximated by the effective width of the fundamental mode and is given by $$W_e \cong W + \left(\frac{\lambda}{\pi}\right)\left(\frac{n_2}{n_1}\right)^{2\sigma}(n_1^2 - n_2^2)^{-(1/2)} \quad (2)$$

where σ=0 for TE, σ=1 for TM, and $n_1$ and $n_2$ are the refractive indices of the core and cladding, respectively.

To change the beatlength, $n_{ver}$ and/or $W_e$ can be varied. As indicated in Equation (1), the beatlength is directly dependent on the square of $W_e$ and, therefore, varying $W_e$ rather than $n_{ver}$ has much more pronounced effect on the beatlength. $W_e$ can be changed by varying the index contrast between the core and cladding of the waveguide. If core and cladding have similar themo-optic coefficients (dn/dT), then we can only change $n_{ver}$ and not $W_e$ by changing the temperature of the device. However, If the core and cladding of the waveguides are selected to have suitable refractive indices and of different materials with different thermo-optic coefficients, then the effective width $W_e$ can be altered by changing the temperature.

Figure 2:
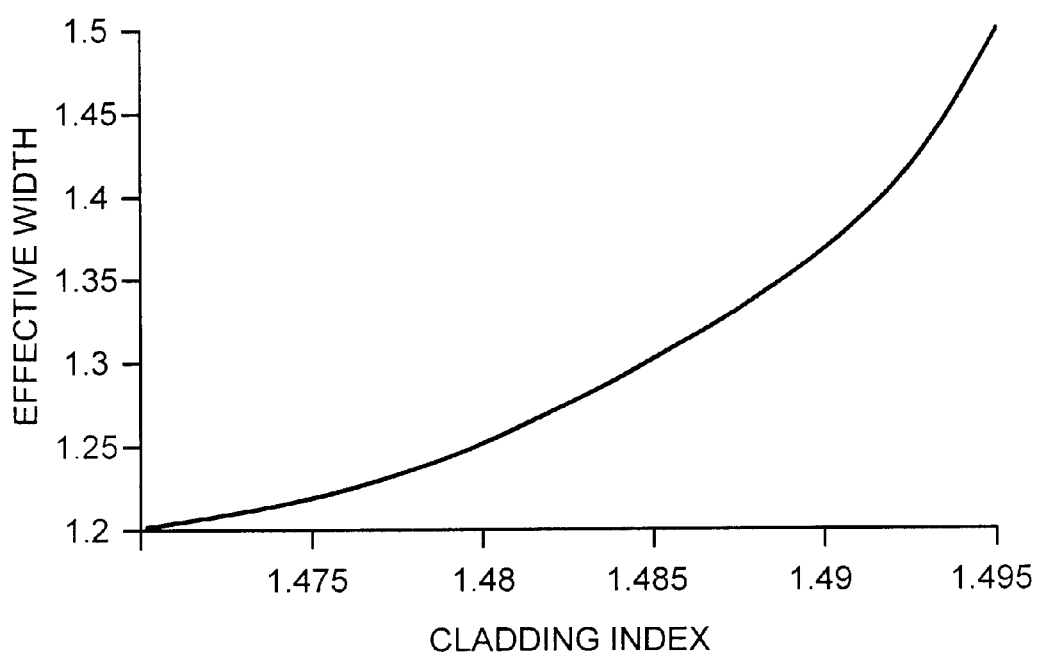
FIG. 2 is a typical plot of the ratio $W_e/W$ of a MMI coupler against the refractive index of the cladding, wherein the refractive index of the core has been kept fixed at 1.5.

FIG. 2 illustrates a variation of the ratio $W_e/W$ against the changes of the refractive index of the cladding for a given MMI coupler. It can be seen that the rate of change of the ratio $W_e/W$ is faster as the refractive indices of the core and cladding become close together. This is evident from Equation (2) wherein the difference between $W_e$ and W gets smaller for waveguide with higher contrast (i.e., larger difference between $n_1$ and $n_2$). Thus, if the MMI coupler is weakly confining, the effective width of the MMI coupler can be changed efficiently by varying the refractive index of either the core or the cladding, while keeping the other one relatively unchanged. This method is much more effective than changing $n_{ver}$.

EXEMPLARY EMBODIMENT

The parameter values shown in the following table show a design example. A change of 0.01 in the refractive index value of the cladding is required for the switching operation. Assuming a $dn_2/dT = 2.5 \times 10^{-4}$/K, which is a typical value for polymers, the required change in the temperature of the device for 0.01 change in refractive index of the cladding is about 40 degrees Centigrade. The coupler length is about 670 μm. An extinction ratio of more than 20 dB can be easily achieved. The device has a wide bandwidth.

|            | MMI    | in/out guides |                                                              |
|------------|--------|---------------|--------------------------------------------------------------|
| Width      | 8 μm   | 3 μm          | $n_{core} = 1.50$  $L_{\pi,1} = 167.5$ μm                   |
| # of modes | 2/3    | 1             | $n_{clad,1} = 1.49$  $L_{\pi,2} = 133.5$ μm                 |
|            |        |               | $n_{clad,2} = 1.48$                                          |

Of course, numerous other embodiments may be envisaged, without departing from the spirit and scope of the invention.

What is claimed is:

1. A multi-mode interference coupler for coupling light between ports, comprising:

a first input port for launching light into a core of a substantially planar waveguide of a first material having a first refractive index $n_1$, the substantially planar waveguide having a response that confines the light to a single mode in one dimension, and multi-mode in another dimension;

at least two output ports for receiving light launched into and propagating through the core from the input port;

a polymer cladding of a second material having a refractive index $n_2$ covering at least a portion of the core; and, a heater thermally coupled to said cladding for heating the cladding in dependence upon a control signal, to vary at least one of a) the amount of light received at the at least two output ports and, b) the ratio of light distributed between the output ports, wherein at least one of the first material and the second material is a polymer.

2. A coupler for coupling as defined in claim 1, wherein the first material is a non-polymer.

3. A coupler as defined in claim 2, wherein first material is glass.

4. A coupler as defined in claim 3 further wherein the MMI coupler is a thermo-optic switch, splitter, or attenuator and wherein the first input port is at a first end and wherein the at least two output ports are at a second end.

5. A coupler as defined in claim 2, further comprising a second input port, adjacent the first input port.

* * * * *